Dec. 21, 1965   E. B. LOPKER   3,224,462
NON-METAL VALVE

Filed Sept. 12, 1963   2 Sheets-Sheet 1

INVENTOR.
EDWIN B. LOPKER
BY *Adams, Forward &*
*McLean*

ATTORNEYS.

Dec. 21, 1965   E. B. LOPKER   3,224,462
NON-METAL VALVE
Filed Sept. 12, 1963   2 Sheets-Sheet 2
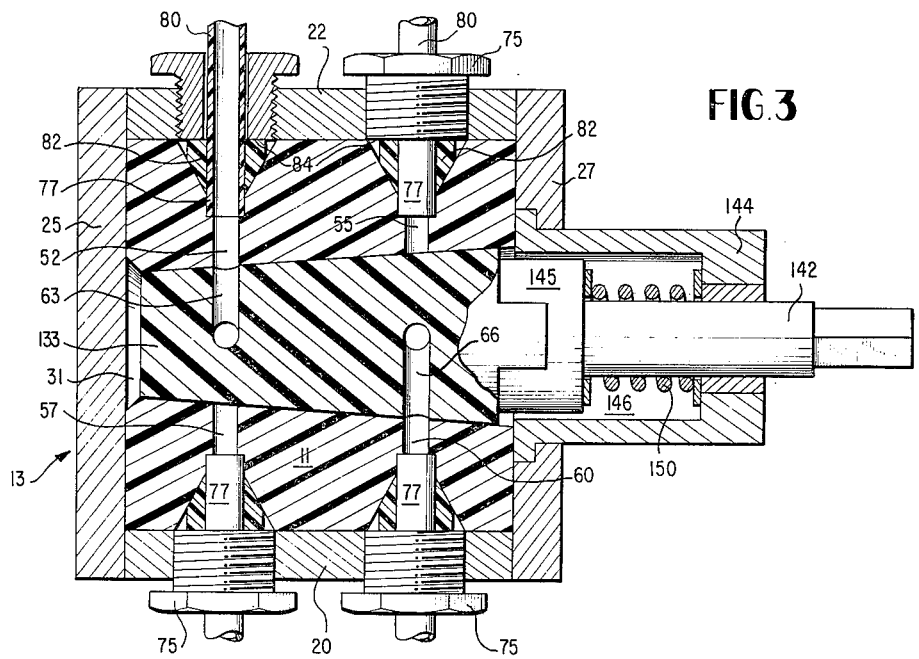

United States Patent Office 3,224,462
Patented Dec. 21, 1965

3,224,462
NON-METAL VALVE
Edwin B. Lopker, 2841 NE. 33rd Court,
Fort Lauderdale, Fla.
Filed Sept. 12, 1963, Ser. No. 308,429
15 Claims. (Cl. 137—625.19)

This application is a continuation-in-part of my copending application Serial No. 225,600, filed September 24, 1962, now abandoned.

This invention concerns a new and improved valve suitable for controlling the flow of fluid under pressure without contact between the fluid and metal. The body of the valve can be manufactured from natural or synthetic resins. In the valve of this invention internal pressures within the body are transmitted to a metal case which closely and substantially completely encloses the plastic valve body. The metal case also is provided with means for attachment to the valve of fluid conduits. Thus, the plastic body itself is usually free from the strains associated with the attachment of such conduits.

As a device which controls fluid flow, a valve usually is comprised of a stationary body, to which fluid conduits are more or less rigidly attached, a well as one or more moving members, frequently internal of the body. Minimum requirements for the configuration of a valve body generally include at least one internal passageway and conduits connecting this passageway to entry and exit ports. For example, in a plug valve, a closely-fitted central shape, commonly called the plug, is rotated within the stationary valve body and a fluid is directed from one or more entrance ports in the valve body to one or more discharge ports, or flow is stopped, by controlling the radial relationship between the ports in the body and ports and passageways in the rotatable plug.

Valve bodies ordinarily are more-or-less cylindrical in shape and usually are made of metal in order to resist the stresses involved in movement of the valve parts and in holding a fluid under pressure. The manufacture of metal valves is ordinarily a rather complex undertaking involving high temperature molding, forging, and/or machining operations and where a corrosive fluid is to be handled by the valve, corrosion resistant metals, which often are quite expensive, must frequently be resorted to, and the massive size often necessary for these metals to have the desired strength adds to the expense.

Modern synthetic resin materials usually are much more resistant to certain types of chemical attack than are many of the metals. Many plastics offer greater ease of manufacture than most metals but these plastics frequently are adversely affected by heat or cold. Polyfluoroethylene polymers such as Teflon and Kel-F have proven to be temperature stable in many fluid handling applications and also "self-lubricating" but such resins usually require expensive pressure molding techniques for their fabrication. Such techniques are of even further increased expense when close tolerance features such as threads are to be molded into them. Such plastic fluid handling fittings are generally recommended only for low pressure systems because in general, they are inferior to most metals in their strength, particularly when the stress is imposed in tension or in shear; some resins exhibit a tendency to slowly but continuously deform when under stress. Some commercially produced Teflon fittings are recommended only for uses where the pressure does not exceed 15 p.s.i.

As a result, the use of synthetic resins in valve bodies for high pressure systems is mainly confined to basically metallic valves having a sleeve of natural or synthetic resin pressed or molded therein. Such valve arrangements, however have manufacturing disadvantages, and, furthermore, usually fail to prevent contact between the metal and the fluid being handled, especially when a multiway valve is employed.

This invention presents a valve having a natural or synthetic resin material body in which the usual limitations of pressure and temperature conditions imposed by previously considered all-plastic valves are substantially widened. Also, it is a feature of this invention that costly metals are not needed since no metal contact with the fluid handled need occur. This invention is particularly applicable to plug valves, especially of the type where plug rotation, rather than retraction, governs the fluid flow and therefore more precision is required, although its principle may be applied to other types.

In this invention the valve body is substantially completely enclosed and locked against movement, especially rotation, within a metal case conforming to the size and shape of the valve body. The metal case also is provided with means for readily connecting and disconnecting the valve body with conduits, especially non-rigid conduits, which ideally may also be of plastic or metal internally provided with plastic. This invention often avoids the need for supporting rigid or non-rigid conduits at points auxiliary to the valve, the need for which support is often detrimental to ready demountability of the conduits. Preferably the valve body and all other plastic parts of the valve are free from threads which, in plastic, are easily worn away.

The means by which the valve body is locked against rotation within the metal case may be teeth or even metal projections which fit snugly into depressions or even blind passages within the valve body. Preferably, however, the locking means are inherent in the very shape of the plastic valve body and the metal case, for example, the valve body may have at least one plane surface at its exterior which matches with an interior plane surface of the metal case, the plane surfaces intersecting a surface of rotation which the outside of the valve might generate in its use.

Preferably, the valve body is a polyhedron made of a natural or synthetic resin material and is substantially completely enclosed within a metal case having a polyhedral internal configuration conforming to the size and shape of the valve body. For example, the valve body may be in the shape of a cube and the metal case may be comprised of three pairs of metal cover plates which are fastened to each other. Such fastening may be performed, for example, by attaching each plate at its edge to each adjacent plate or by attaching each cover plate to the plate opposite it by means of bolts, rivets, or other fastening members perhaps passing through holes in the valve body. The size of each cover plate and the resulting metal case is such that when the cover plate is in contact with its corresponding surface on the valve body, essentially all of the valve body surface in that plane is contacted by the cover plate. Thus, when three pairs of cover plates are fastened together a hexahedral plastic valve body is essentially enclosed by the metal cover plates. If desired, a certain amount of pre-stressing in compression may be applied to the plastic valve body. In any event, the plastic valve body is completely restrained by the metal case and the internal pressures which may be safely accommodated are now governed by the strength of the metal case, including its fastening means, and not by the limited strength of the plastic valve body. It is apparent that ordinary metal sheet stock, square tube stock, etc. may be employed as elements of the case.

In a plug valve which employs this invention, the plug preferably also is of a natural or synthetic resin material. The plug usually has a smooth surface and may be cylindrical, spherical or, most commonly of a tapered cylindrical shape that is, a truncated cone; the essential flat or planar surface of the plastic body will generally be parallel to the axis of this cylinder or cone. The ports in the plug and in the body are commonly circular, or nearly so, in cross-section. Usually, one end of the plug extends out of the body in order that the necessary rotating force may be applied to the plug, this end usually being called the stem, or shank, and it is sometimes integral with the plug, although a metal stem or shank may be used, the stem being secured to the plug by various common means such as pinning, molding and so on. The means of holding the plug in contact with the body often depends upon the shape of the plug and often this means will include a coiled spring. Where the plug is tapered the spring is usually adjacent the base of the truncated cone.

The valve body will often have a port on each of two or four of its sides leading, by means of passages in the body, to the preferably smooth central opening which contains the plug valve. However, it will be understood that the provision or omission of certain ports does not limit the scope of this invention, although obviously two ports would be a minimum in any event, one for the fluid to enter and one for the fluid to leave. Holes in the metal case are provided to correspond to the ports in the plastic valve body. Also, the openings in the plug may consist of a straight-through passage, passages which form L's or T's in cross-section, and so on, all as may be best suited for the control and direction of the fluid flow which is desired. Such arrangements are commonly provided in plug-valves to suit the requirements of the application.

This invention, in order to be used in relatively high pressure applications, provides that the metal case take the strain involved in connections between the plastic valve body and the associated fluid conduits, while still preventing any fluid contact between the fluid and metal. Thus this invention provides for secure fastening of the valve to, for example, non-rigid fluid conduits such as rubber tubes or plastic piping, without the risk of metal-fluid contact. These means preferably are such as to avoid the need for undue strain on the conduit ends, for example, the invention avoids the need to thread the ends of the resinous conduits. Certain high pressure applications may require the provision of metal sheaths for the resinous conduits. In such situations this invention provides for conduit connection between the metal sheath and metal valve case as well as close fitting of the resinous conduit and plastic valve body. This allows the metal for these parts to be selected on the basis of structural properties without the necessity of the metal being also suitable for contact with the fluid being handled, i.e., non-corrosive, non-contaminating, etc. Also, when it is desirable to use non-corrosive metals for the conduits, this invention makes it possible to avoid threading these metals which, like copper, are often too soft for the threads to withstand great strains.

Usually the connection between resinous conduit and valve body includes a depression or cut-away portion in the surface of the valve body under the hole in the metal case. Often, and most practically, the depression is made by machining, molding, etc., the surface of the valve body surrounding the port to which the conduit is to be connected to provide a nipple, over which the end of the conduit is placed. Alternatively, a simple depression may be made in the surface of the valve body at the port and the end of the conduit may be provided with a relatively rigid sleeve to provide a shoulder against which a fastening member, fastened to the metal valve case, may bear. This fastening member may be permanently fixed to the hole in the metal valve case, but when the conduits are to be readily disconnectable, the fastening is usually done by mating threads on the fastening member and the interior of the hole in the metal valve case, although other readily demountable fastening mechanisms may be employed. Preferably, a threaded flare nut is screwed into the metal case hole to hold the end of the conduit firmly against the nipple surrounding the port. The metal case at the valve ports may, in some circumstances, not be thick enough to accommodate the desired thread length, and, in such event, bosses may be provided to accommodate the additional length of thread.

By the terms "plastic" or "natural or synthetic resins" are meant those solid organic, generally polymeric materials which are susceptible to plastic working and include both the thermosetting and thermoplastic types. Of greatest avaliability are the thermoplastic resins of the polymerized vinyl or olefin types, such as PVC (polyvinyl chloride), polyethylene, both of the high density and low density types, polypropylene, etc. The fluoroethylene polymers sold under the tradenames "Teflon" and "Kel-F" are especially useful for the manufacture of valve bodies and plugs according to this invention as mentioned because of their outstanding resistance to chemical attack and high temperature deformation and because of their self-lubricating properties. It will also be understood that the use of the term "plastic" also includes such modified plastics as may be obtained by combining two or more resinous materials and/or fillers such as glass, graphite, calcium fluoride, etc., with a resin in order to modify certain characteristics of the plastic. These plastics are commonly called modified or filled plastics. The term "metals," as used herein, referes to any one or more of the materials commonly referred to as such, more specifically such materials as steel, stainless steel, brass, bronze, aluminum, etc.

The invention will be better understood by reference to the accompanying drawings which are not to be considered limiting and in which:

FIGURE 3 is another enlarged cross-section where the plug has a taper opposite to that shown in FIGURE 2 and another type of fluid conduit connection is employed;

FIGURE 4 shows another type of conduit connection; and

FIGURE 5 shows still another type of connection.

Figure 1:
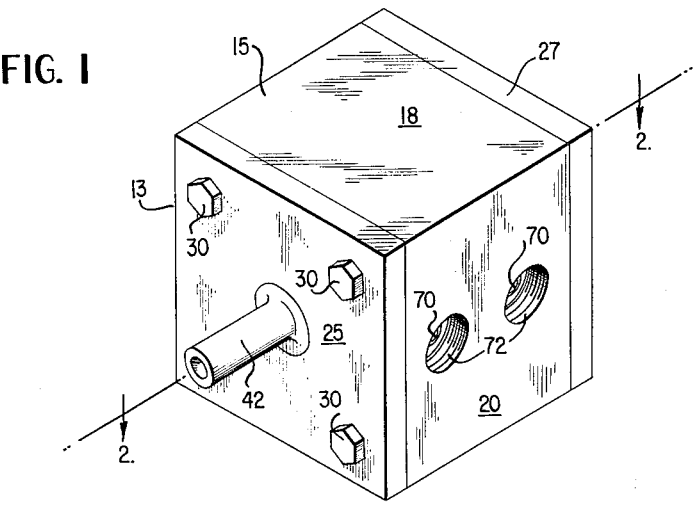
FIGURE 1 is a perspective view of a plug valve embodying this invention.
Figure 2:
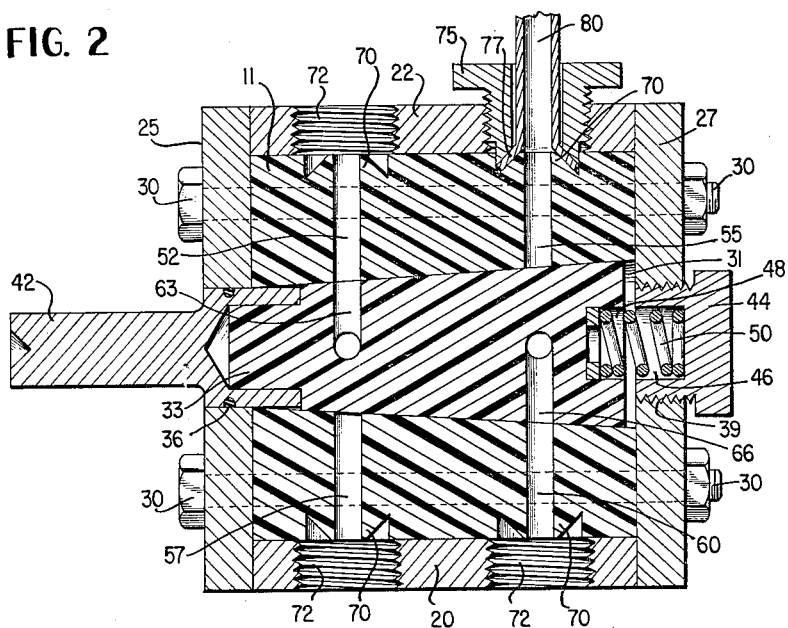
FIGURE 2 is an enlarged cross-sectional view along the line 2—2 of FIGURE 1 which, in addition to the valve body shows a tapered plug and a fluid conduit connection.

In the figures, the valve body comprises the plastic parallelepiped 11 which is substantially completely and firmly enclosed by the metal case 13. In the embodiments shown, the metal case consists of a polyhedral sleeve 15 having the top 18, the side faces 20 and 22 and a bottom (not shown). The metal case is completed by the cover plates 25 and 27, which in FIGURE 2 are fastened together by the bolts 30 which pass through the cover plates 25 and 27 as well as the valve body 11. In FIGURE 3, the cover plate 25 is welded to the sleeve. When a sleeve such as 15 is used to form part of the metal case as shown, there is integral attachment of the adjacent sides of the case. However, these sides may also be formed of separable uniplanar or biplanar, etc., plates joined together by bolts or other fastening means which may run through the plastic valve body or which may join the plates together outside of the plastic valve body.

As shown, in the plug-valve embodiment of this invention, the valve body and the metal case are provided with a smooth central passageway 31 which contains the smooth plug 33. Although the passageway may communicate with outside the body and case at only one side of the body as in FIGURE 3, allowing the passageway to pass entirely through the body 11 from one side to the opposite side, the valve may be modified, as shown in FIGURE 2, to allow the central passageway to pass through both opposite sides of the case as well, providing openings 36 and 39 in the metal box. In FIGURE 2 the plug 33 is continued on the one end by the handle or operator 42 and on the other end by the spring holder or cap 44. This cap need not be movable once the valve is assembled and it conveniently may provide a recess 46 which, with a mating recess 48 in the plug 33 may provide a container for the coil spring 50 which serves to keep the plug 33 firmly seated against the walls of the central passageway. The handle or operator 42 may be attached to the opposite end of plug 33 by any convenient means.

In FIGURE 3 an embodiment is presented wherein the handle 142 is rigidly connected to the plug 133 by means of a yoke 145. Spring holder 144 is provided with a central opening for passage of the handle 142 and also provides the recess 146 which holds the spring 150 which, again, holds the plug firmly against the walls of the central passageway. Suitable bearings, etc., also usually are provided for the handle, spring, etc.

The valve body 11 is also provided with ducts 52, 55, 57 and 60 which lead from the central passageway 31 to the outside of the body. As can be seen, the metal box 15 is provided with holes corresponding to the locations at which these ducts, as well as the central passageway, reach the surfaces of the valve body. The plugs 33 and 133 are provided with the ducts 63 and 66 which mate with the ducts of the valve body and generally are joined together by a longitudinal or other duct system (not shown) within the plug.

In order to provide a strong and positive coupling with the conduits leading to the vlave, the valve body around the ducts may be machined, molded or otherwise provided with conduit connecting means. Usually the connecting means is a depression in the surface of the valve body. In the embodiment of FIGURE 2, these means are the nipples 70, and the holes in the metal box corresponding to the ducts of the valve body may be provided with suitable fastening means, for example the internal threads 72. The threaded inverted flare nut 75 may then be employed to confine the end 77 of the conduit 80 between the nut 75 and the nipple 70.

In the embodiment of FIGURE 3, the end 77 of the conduit 80 is provided with the tapered sleeve 82 which may be separate or fastened rigidly to the end 77 of the conduit or made integral therewith. The threaded nut 75 bears against a shoulder 84 of this tapered sleeve. In FIGURE 4 the sleeve is a beveled sleeve 86 which, again, may be separate or rigidly attached to or integral with the end 77 of conduit 80. In this embodiment the threaded flare nut 75 has a bottom depression 88 for close contact with the beveled sleeve. It will be noted that in the connection embodiments of FIGURES 3 and 4, the plastic valve body 11 is provided with a relatively simple, tapered-wall, depression at the portion where the duct reaches the surface. The threaded flare nut is threaded only into the metal case 22, so that pressure or strain tending to pull the conduit 80 out of the valve body 11 is transmitted to and resisted by the connection between the metallic elements 75 and 22. It will be apparent that, instead of the threaded connection shown, other types of connection between these metal elements may be employed and they may even be welded together when demounting of the conduits is not contemplated.

FIGURE 5 shows a plain pipe connection between the metal case 22 and the metallic conduit sheath 90. In this modification, also, the boss 93 is provided around the hole 72 to provide extra bite for the threaded connections. It will be understood, of course, that the connecting means illustrated are but several by which the desired conduits may be attached to the valve.

It will be observed that in this invention the tension and shear forces are essentially absorbed by the metal and, if used, by the flare nut; the valve body and the end of the tubing being essentially in compression. It will also be noted that the fluid being handled contacts only the valve body and internal surface of the tubing in passing to or from the valve. By using plastic tubing of Teflon, Kel-F, olefin polymers, PVC, nylon-reinforced PVC, etc., in conjunction with a plastic plug in the plastic body, for example, a glass and graphite filled Teflon plug in a glass-filled Teflon body, all contact with metals may be avoided. The connections shown in FIGURES 2 to 5 may, however, be used with tubing of any ductile metal suitable for flaring, either plain metal tubing or with plastic-lined metal tubing, as may best suit the application.

This invention, therefore, provides a valve which can handle a fluid without permitting the fluid to contact any metal parts. Since the plastic valve body of this invention is locked to the metal case and since the metal case conforms at least internally to this configuration of the body, failure of alignment between the holes in the case and the ports in the body, as well as rotation of the body within the metal case is not possible. When the preferred embodiment of this invention is employed, presenting a valve body having at least one flat or planar surface which intersects a surface of rotation which would be formed if the valve body rotated with the plug, special provision to prevent such rotation is unnecessary.

It is claimed:

1. A valve comprising a plastic body having at least one internal passageway providing a fluid connection to a plurality of ports at the surface of the body and a metal case substantially completely enclosing said body, being locked against rotation relative to the body, having an internal configuration corresponding to the external shape of the body and being provided with holes corresponding to the ports in the body, said holes being provided with means for securing fluid conduits to the body, said body having a surface depression at said ports for connection to said fluid conduits.

2. The valve of claim 1 in which the securing means are threads suitable for engagement with nuts.

3. A valve suitable for controlling the flow of fluid under pressure while preventing contact of the fluid with metal which comprises a plastic plug in an internal passageway of a plastic body, said plug providing a fluid connection to a plurality of ports at the surface of the body, and a metal case substantially completely enclosing said body, having an internal configuration corresponding to the external shape of the body, being locked against rotation relative to the body and being provided with holes corresponding to the ports in the body, said holes being provided with means for securing fluid conduits to the body, said ports being provided with depressions in the surface of the body for connection to said conduits.

4. The plug valve of claim 3 in which said body has at least one flat surface intersecting a surface of rotation of the body.

5. The plug valve of claim 4 in which the plug is generally cylindrical and the flat surface is parallel to the axis of the cylinder.

6. The plug valve of claim 3 in which the said holes are provided with internal threads for reception of means to secure conduits to said depressions.

7. A valve suitable for controlling flow of fluid under pressure while preventing contact between the fluid and metal which comprises a generally cylindrical plastic plug having a first duct aligned with the axis of the cylinder and secondary ducts connecting said first duct to holes at the surface of the plug, a plastic valve body having a smooth internal passageway conforming to the external shape of said plug, and being provided with ducts leading from the said internal passageway to ports at the external surface of the body, a metal case substantially completely enclosing said body, having an internal configuration corresponding to the external shape of the body, being locked against rotation relative to said body and being provided with holes corresponding to the said ports and resilient means to hold holes at the surface of the plug in alignment with said ducts of said body, said holes in said case being provided with means for holding conduits securely against said body.

8. The valve of claim 7 in which the plug is provided at one end with a handle which passes through the case and at one end with said resilient means comprising a spring, connected to the case, for adjustingly holding the holes at the surface of the plug in alignment with said ducts of said body.

9. The valve of claim 8 in which the plug is tapered.

10. The valve of claim 7 in which the body has at least one flat surface parallel to the axis of the cylinder.

11. A multi-way valve suitable for controlling the flow of fluid under pressure which comprises a generally cylindrical, rotatable plastic plug having a first duct aligned with the axis of the cylinder and a plurality of ducts connecting said first duct to holes at the surface of the plug, a plastic valve body having a smooth internal passageway conforming to the external shape of said plug, and being provided with a plurality of sets of ducts leading from the said internal passageway to ports at the external surface of the body, rotation of the plug serving to provide connection between members of a set of ducts while cutting off connection between members of other sets, adjustable means to hold holes at the surface of the plug in alignment with said duct in said body, a metal case substantially completely enclosing said body, having an internal configuration conforming to the external configuration of said body, having means for locking said body against rotation relative to said case, and being provided with holes having means for securing conduits to said body at said ports.

12. The valve of claim 11 in which the body at the portions surrounding said ports is provided with depressions and nipples for reception of fluid conduits passing through said holes whereby nuts may be threaded into said holes to hold the fluid conduits in liquid-tight engagement with said ducts.

13. The valve of claim 11 having at least one flat surface parallel to the axis of the cylinder.

14. A valve suitable for controlling the flow of fluid under pressure while preventing contact of the fluid with metal which comprises a plastic plug in an internal passageway of a plastic body, said plug providing a fluid connection to a plurality of ports at the surface of the body, and a metal case substantially completely enclosing said body, having an internal configuration corresponding to the external shape of the body, being locked against rotation relative to the body and being provided with holes corresponding to the ports in the body, said holes being provided with means for securing fluid conduits to the body, said ports being provided with depressions in the surface of the body and with nipples for reception of fluid conduits.

15. The valve of claim 14 in which the plug is cylindrical and the said body has at least one flat surface parallel to the axis of the cylinder.

References Cited by the Examiner

UNITED STATES PATENTS

| 14,988 | 5/1856 | Fox | 251—309 X |
| 2,792,018 | 5/1957 | Turak | 137—625.19 X |
| 2,854,027 | 9/1958 | Kaiser | 251—366 X |
| 2,987,295 | 6/1961 | Schenck | 251—368 X |
| 3,038,694 | 6/1962 | Dunbeck | 251—368 X |
| 3,041,036 | 6/1962 | McFarland | 251—368 X |

FOREIGN PATENTS 1,193,786  5/1959  France.

M. CARY NELSON, *Primary Examiner.*